United States Patent
Yang

(10) Patent No.: US 10,452,492 B2
(45) Date of Patent: Oct. 22, 2019

(54) METHOD, APPARATUS, AND COMPUTER PROGRAM STORED IN COMPUTER READABLE MEDIUM FOR RECOVERING BLOCK IN DATABASE SYSTEM

(71) Applicant: TmaxData Co., Ltd., Gyeonggi-do (KR)

(72) Inventor: Eunmo Yang, Gueonggi-do (KR)

(73) Assignee: TMAXDATACO., LTD. (KR)

( * ) Notice: Subject to any disclaimer, the term of this patent is extended or adjusted under 35 U.S.C. 154(b) by 346 days.

(21) Appl. No.: 15/168,782

(22) Filed: May 31, 2016

(65) Prior Publication Data

US 2017/0308444 A1 Oct. 26, 2017

(30) Foreign Application Priority Data

Apr. 22, 2016 (KR) ........................ 10-2016-0049366

(51) Int. Cl.
*G06F 11/14* (2006.01)
*G06F 16/21* (2019.01)
*G06F 16/23* (2019.01)
*G06F 16/27* (2019.01)

(52) U.S. Cl.
CPC ...... *G06F 11/1469* (2013.01); *G06F 11/1451* (2013.01); *G06F 11/1464* (2013.01); *G06F 16/21* (2019.01); *G06F 16/2365* (2019.01); *G06F 16/273* (2019.01)

(58) Field of Classification Search
CPC ............. G06F 11/1469; G06F 11/1451; G06F 11/1464; G06F 17/30289; G06F 16/21; G06F 16/273; G06F 16/2365

USPC .......................................................... 707/675
See application file for complete search history.

(56) References Cited

U.S. PATENT DOCUMENTS

| | | | |
|---|---|---|---|
| 5,485,608 A * | 1/1996 | Lomet | G06F 11/1471 |
| 6,856,993 B1 * | 2/2005 | Verma | G06F 17/30227 |
| 7,111,005 B1 | 9/2006 | Wessman | |
| 7,383,463 B2 * | 6/2008 | Hayden | G06F 11/2069 |
| | | | 714/4.11 |
| 7,415,466 B2 * | 8/2008 | Ganesh | G06F 11/1471 |
| 8,234,517 B2 | 7/2012 | Bamford et al. | |
| 8,510,334 B2 * | 8/2013 | Chan | G06F 17/30362 |
| | | | 707/610 |
| 8,566,326 B2 | 10/2013 | Hu et al. | |
| 9,411,815 B1 * | 8/2016 | Lu | G06F 11/1446 |
| 2004/0215640 A1 * | 10/2004 | Bamford | G06F 17/30575 |
| 2005/0091450 A1 * | 4/2005 | Frolund | G06F 11/1076 |
| | | | 711/114 |

(Continued)

*Primary Examiner* — James Trujillo
*Assistant Examiner* — Jessica N Le
(74) *Attorney, Agent, or Firm* — Fish IP Law, LLP

(57) ABSTRACT

Provided is a method for recovering a block in a database system. Provided is a method for recovering a database block, including: deciding one or more recovery candidate blocks by reading log data recorded in a persistent storage medium; deciding master nodes of the one or more respective recovery candidate blocks; and re-reading the log data in order to permit proxy nodes of the one or more recovery target blocks to recover at least one recovery target block among the one or more recovery candidate blocks in parallel, at least one recovery target block among the one or more recovery candidate blocks being decided by the master nodes of the one or more recovery candidate blocks.

8 Claims, 6 Drawing Sheets

(56) References Cited

U.S. PATENT DOCUMENTS

2005/0091556 A1* 4/2005 Frolund .............. G06F 11/1076
714/2
2006/0101033 A1* 5/2006 Hu ...................... G06F 11/1471
2011/0258164 A1* 10/2011 Mandagere ......... G06F 11/1435
707/685
2014/0181035 A1* 6/2014 Moue .................. G06F 17/3033
707/647

* cited by examiner

METHOD, APPARATUS, AND COMPUTER PROGRAM STORED IN COMPUTER READABLE MEDIUM FOR RECOVERING BLOCK IN DATABASE SYSTEM

This application claims priority to and the benefit of Korean Patent Application No. 10-2016-0049366, filed in the Korean Intellectual Property Office on Apr. 22, 2016, the entire contents of which are incorporated herein by reference.

FIELD OF THE INVENTION

The present disclosure relates to a method for recovering data in a database system, and particularly, to a method for efficiently recovering data stored in a persistent storage medium.

BACKGROUND OF THE INVENTION

A database system can collect, store, manage, and analyze data. In recent years, technology of large-size database systems such as mass structured or unstructured data sets and big data processing for extracting a value from the data and analyzing a result has been developed.

When the database system performs a database operation, the database system utilizes a buffer cache for decreasing an I/O time. For example, when a node included in the database system intends to change data recorded in a persistent storage medium, the node loads data from the persistent storage medium, stores the loaded data in the buffer cache, changes an object stored in the buffer cache, and thereafter, reflects the changed data to the persistent storage medium.

Various errors may occur in the database system. For example, all nodes included in the database system may not operate. Further, a predetermined node among a plurality of nodes may not operate and a part of the persistent storage medium may not operate.

In this case, recovering a block is required for preventing a loss of data caused due to the error which occurs. For example, when the error occurs in the node after changing the object stored in the buffer cache, and before reflecting the changed object to the persistent storage medium, an error may occur, in which the changed object is not reflected to the persistent storage medium. In this case, a recovery for reflecting the changed object to the block is required.

A data recovery by the existing scheme is performed by one node to cause a lot of inefficiency. Accordingly, research into an efficient data recovery method is required.

SUMMARY OF THE INVENTION

The present disclosure has been made in an effort to efficiently recover data in a database system.

A first exemplary embodiment of the present disclosure provides a method for recovering a database block, including: deciding one or more recovery candidate blocks by reading log data recorded in a persistent storage medium; deciding master nodes of the one or more respective recovery candidate blocks; and re-reading the log data in order to permit proxy nodes of the one or more recovery target blocks to recover at least one recovery target block among the one or more recovery candidate blocks in parallel, at least one recovery target block among the one or more recovery candidate blocks being decided by the master nodes of the one or more recovery candidate blocks.

A second exemplary embodiment of the present disclosure provides a database system including: a plurality of nodes, wherein a coordinator node among the plurality of nodes includes a recovery candidate block deciding unit deciding at least one recovery candidate block by reading log data recorded in a persistent storage medium, a master node deciding unit deciding master nodes of the one or more respective recovery candidate blocks; and a recovery data acquiring unit acquiring recovery data of at least one recovery target block by re-reading the log data recorded in the persistent storage medium, each of the one or more master nodes among the plurality of nodes includes a recovery target block deciding unit deciding the recovery target block among the one or more recovery candidate blocks, each of one or more proxy nodes among the plurality of nodes includes a recovery performing unit recovering the recovery target block based on the acquired recovery data of the at least one recovery target block, and the proxy nodes of the one or more respective recovery target blocks perform the recovery in parallel.

A third exemplary embodiment of the present disclosure provides a database recovery program which is stored in a computer-readable medium and includes commands to allow nodes to perform the following operations, the operations including: an operation of deciding, by a coordinator node, at least one recovery candidate block by reading log data recorded in a persistent storage medium; an operation of deciding, by the coordinator node, master nodes of the one or more respective recovery candidate blocks; an operation of deciding, by the master nodes of the one or more respective recovery candidate blocks, at least one recovery target block among the one or more recovery candidate blocks; an operation of acquiring, by the coordinator node, the decided log data of the at least one recovery target block by re-reading the log data recorded in the persistent storage medium; and an operation of recovering, by proxy nodes of the one or more respective recovery target blocks, the recovery target block based on the acquired log data of the at least one recovery target block, wherein the proxy nodes of the one or more respective recovery target blocks perform the recovery in parallel.

According to exemplary embodiments of the present disclosure, provided is a method for efficiently recovering data in a database system.

BRIEF DESCRIPTION OF THE DRAWINGS

Various aspects are now described with reference to the drawings and like reference numerals are generally used to designate like elements. In the following exemplary embodiments, for description, multiple specific detailed matters are presented to provide general understanding of one or more aspects. However, it will be apparent that the aspect(s) can be executed without the detailed matters. In other examples, known structures and apparatuses are illustrated in a block diagram form in order to facilitate description of the one or more aspects.

DETAILED DESCRIPTION

Figure 1:
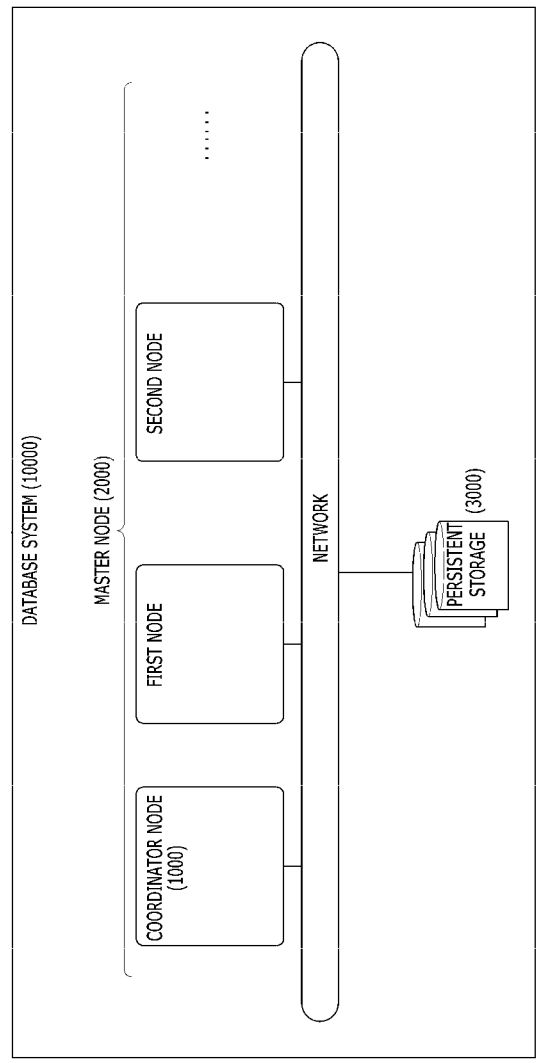
FIG. 1 exemplarily illustrates a database system according to an exemplary embodiment of the present disclosure.

Various exemplary embodiments will now be described with reference to the drawings and similar reference numerals are used to represent similar elements throughout the drawings. In the present specification, various descriptions are presented to provide appreciation of the present disclosure. However, it is apparent that the exemplary embodiments can be executed without the specific description. In other examples, known structures and apparatuses are presented in a block diagram form in order to facilitate description of the exemplary embodiments.

"Component", "module", "system", and the like which are terms used in the present specification designate a computer-related entity, hardware, firmware, software, and a combination of the software and the hardware, or execution of the software. For example, a component may be a processing process executed on a processor, the processor, an object, an execution thread, a program, and/or a computer, but is not limited thereto. For example, both an application executed in a computing device and the computing device may be components. One or more components may reside in the processor and/or execution thread and one component may be localized in one computer or distributed among two or more computers. Further, the components may be executed by various computer-readable media having various data structures, which are stored therein. The components may perform communication through local and/or remote processing according to a signal (for example, data through other system and a network such as the Internet through data and/or a signal from one component that interacts with other components in a local system and a distribution system) having one or more data packets, for example.

In the present specification, a database means a system that stores correlated data in formats which a computer may process. The database may keep data and answer a question of a user and the data stored in the database may be changed. The database may store new data and delete and change the existing data.

In the present specification, a node means a device that performs a series of tasks such as an exchange of information or a database update. For example, the node may include a server, a computer, a device including a CPU, and the like but is not limited thereto.

The node may transmit and receive data to and from a persistent storage medium 3000. For example, the node may read the data recorded in the persistent storage medium 3000 and store the read data in a cache module. Further, the node may change the data stored in the cache module and reflect the changed data to the persistent storage medium 3000. In addition, the node may recover the data recorded in the persistent storage medium.

In the present specification, the node may play various roles. For example, the node may play a role of a coordinator node 1000, play a role of a master node 2000 of a block, play a role of a proxy node 4000 of the block, perform a combination of the roles, but is not limited thereto.

In the present specification, log data means data storing contents associated with a data change such as transaction or a change of operation information while operating the database. The log data may include redo log data and undo log data.

The redo log data means data, when a fail occurs in the database, required for recovering the fail.

Types of a recovery performed by using the redo log data may include a media recovery used for recovering the database when a media fail which occurs in the case of a physical damage of a disk occurs, an instance recovery for preparing for a loss of transaction data when an instance abnormally ends, and the like but are not limited thereto.

In the present specification, a block may mean a lump of data. For example, a block may include one stable storing data and include a plurality of tables. Further, the data included in one table may be represented by a plurality of blocks.

A block may have various sizes. For example, a block may have sizes of 10 kb, 100 kb, 1 mega byte, 2 mega bytes, 3 mega bytes, 4 mega bytes, and the like but is not limited thereto.

In the present specification, a proxy node may recover a recovery target block. A proxy node means a node that substantially takes charge of the recovery of a block. The proxy nodes of the blocks may be predetermined.

For example, the master nodes 2000 and the proxy nodes of the respective blocks may be the same as each other. In this case, the master node 2000 may recover the block.

The master nodes 2000 and the proxy nodes of the respective blocks may be different from each other. In this case, the block may be recovered by the proxy node.

The description of the presented embodiments is provided so that those skilled in the art of the present disclosure use or implement the present disclosure. It will be apparent to those skilled in the art that various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

Hereinafter, exemplary embodiments of the present disclosure will be described in detail with reference to the accompanying drawings.

FIG. 1 exemplarily illustrates a database system according to an exemplary embodiment of the present disclosure.

A database system 10000 may include a plurality of nodes 1000 and 2000. Each of the nodes 1000 and 2000 may include a predetermined type of computer system or computer device such as a microprocessor, a main frame computer, a digital single processor, a portable device, and a device controller.

Each of the nodes 1000 and 2000 may include a memory (not illustrated). Each of the nodes 1000 and 2000 may perform a database task by using the memory. For example, when each of the nodes 1000 and 2000 performs a transaction, each of the nodes 1000 and 2000 may load data from a persistent storage medium 3000 and store the loaded data in at least a part of the memory (not illustrated).

The node may include a plurality of threads. A thread means one task unit which independently processes a task. For example, each of the plurality of threads may independently perform one task.

The memory (not illustrated) as a primary storage device which a processor autonomously accesses may mean a volatile storage device in which when a power supply is turned off, stored information is instantaneously erased, such as random access memories (RAM) such as a dynamic random access memory (DRAM), a static random access memory (SRAM), and the like, but is not limited thereto. The memory may be operated by the processor.

The nodes 1000 and 2000 and the persistent storage medium 3000 may be connected through a network. The network may include a wired network and a wireless network but is not limited thereto.

The persistent storage medium 300 may include a non-volatile storage medium capable of continuously storing predetermined data. For example, a persistent storage medium 1400 may include a storage device based on a flash memory and/or a battery-backup memory as well as a disk, an optical disk, and a magneto-optical storage device but is not limited thereto.

The plurality of nodes 1000 and 2000 may include a coordinator node 1000 and a master node 2000. In this case, the number of coordinator nodes 1000 may be one or plural but is not limited thereto.

The master node 2000 means a node that manages a block included in the persistent storage medium. For example, the master node 2000 may manage a lock of a specific block included in the persistent storage medium 3000. Each of the plurality of master nodes 2000 may manage one block included in the persistent storage medium 3000 and manage a plurality of blocks stored in the persistent storage medium 3000 but is not limited thereto. The master nodes 2000 of the respective blocks included in the persistent storage medium 3000 may be predetermined.

The coordinator node 1000 may read log data stored in the persistent storage medium 3000. Further, the coordinator node 1000 may determine at least one recovery candidate block based on information acquired by reading the log data.

The coordinator node 1000 may determine the master node 2000 of each of at least one recovery candidate block and transmit data associated with the recovery candidate block to the master node 2000 of each recovery candidate block.

In this case, the coordinator node 1000 may also be the master node 2000 of the recovery candidate block. When the coordinator node 1000 is the master node 2000 of the recovery candidate block, the coordinator node 1000 may not transmit the data associated with the corresponding recovery candidate block.

The master node 2000 of each of the recovery candidate blocks may determine a recovery target block among one or more recovery candidate blocks based on the data associated with the received recovery candidate block.

In this case, the master node 2000 determines whether one or more respective recovery candidate blocks are to be recovered to decide at least one recovery target block among one or more recovery candidate blocks.

According to another exemplary embodiment of the present disclosure, the recovery target block among the recovery candidate blocks may not be present. In this case, the master node 2000 may decide that the recovery target block is not present among the recovery candidate blocks.

The coordinator node 1000 re-reads the log data to acquire log data of at least one recovery target block, recovery data of at least one recovery target block, log data of at least one recovery candidate block, recovery data of at least one recovery candidate block, or a combination thereof and transmit the acquired data to the master nodes of the respective blocks.

According to an exemplary embodiment of the present disclosure, a proxy node of a specific block may be the same as the master node 2000 of the specific block and in this case, the master node 2000 of the specific block may recover the specific block.

According to another exemplary embodiment of the present disclosure, the proxy node of the specific block may be a node different from the master node 2000 of the specific block and in this case, the proxy node of the specific block may recover the specific block.

The proxy node 4000 of each of one or more recovery target blocks may recover the data of the recovery target block recorded in the persistent storage medium 3000 based on the received data. Further, when the proxy node 4000 and the master node 2000 of the recovery target block are the same as each other, the master node 2000 may recover the data of the recovery target block.

In this case, the plurality of respective proxy nodes 4000 may recover the recovery target block in parallel, and as a result, efficiency of data recovery may be increased. Further, the plurality of respective threads included in the proxy node 4000 may recover the recovery target block in parallel, and as a result, the efficiency of the data recovery may be increased.

In this case, the master node 2000 of the recovery target block does not limit an access of other nodes to all tables recorded in the persistent storage medium 3000 and limits only the access to the recovery target block to increase efficiency of database management.

In FIGS. 2 to 5, as exemplary embodiments of the present disclosure, a description of a case where the master node 2000 and the proxy node 4000 of the block are the same as each other is disclosed.

Figure 6:
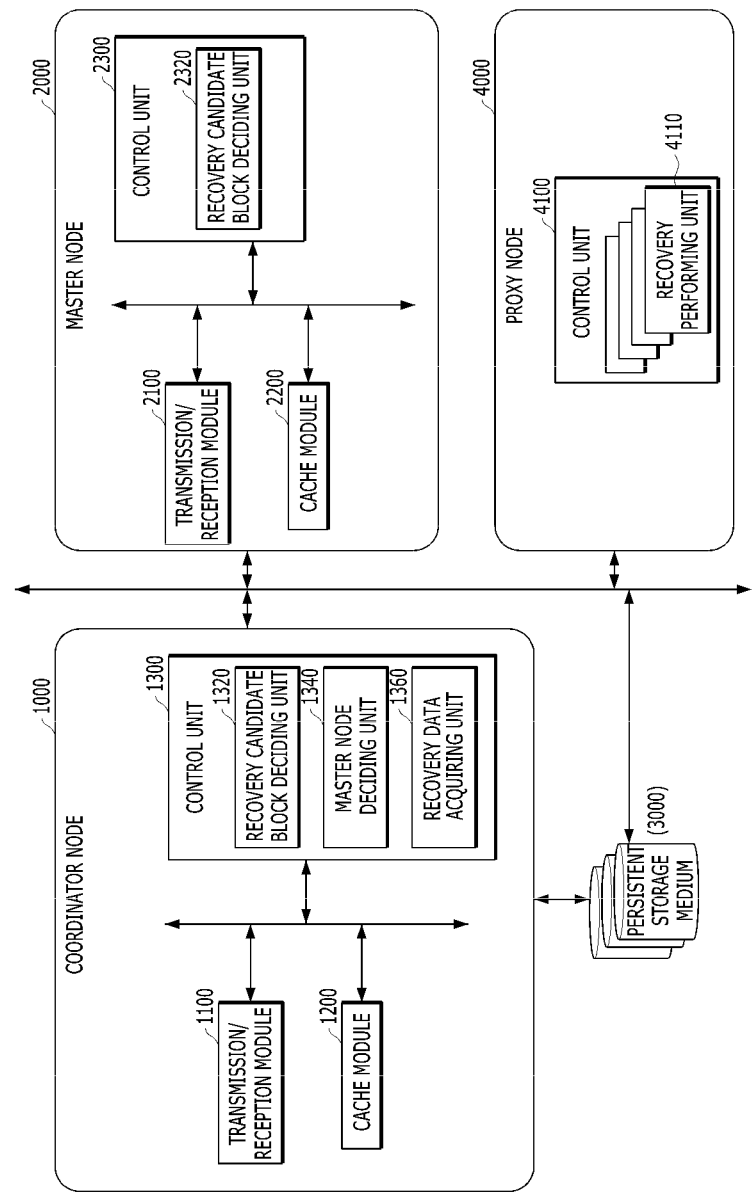
FIG. 6 is a diagram for describing a method for recovering data of a block when a proxy node and a master node of the block are different from each other according to another exemplary embodiment of the present disclosure.

In FIG. 6, as another exemplary embodiment of the present disclosure, a description of a case where the master node 2000 and the proxy node 4000 of the block are different from each other is disclosed.

Figure 2:
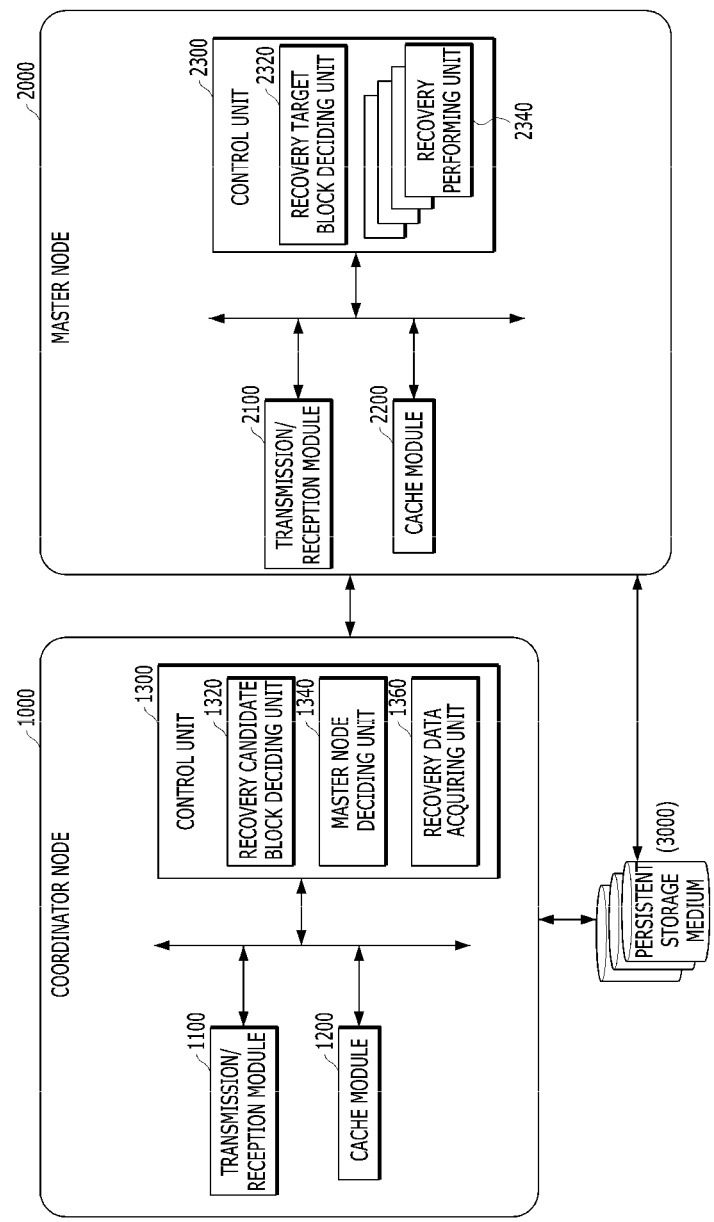
FIG. 2 exemplarily illustrates components of the database system according to the exemplary embodiment of the present disclosure.

FIG. 2 exemplarily illustrates components of the database system according to the exemplary embodiment of the present disclosure.

According to an exemplary embodiment of the present disclosure, the database system 10000 may include the persistent storage medium 3000 and a plurality of nodes.

The persistent storage medium 3000 means, for example, a non-volatile storage medium which may continuously store predetermined data such as a storage device based on the flash memory and/or the battery-backup memory as well as a magnetic disk, the optical disk, and the magneto-optical storage device. The persistent storage medium 3000 may communicate with processors and memories of the nodes through various communication means.

The plurality of nodes may include at least one coordinator node 1000 and at least one master node 2000. Each of the plurality of nodes may be implemented by at least one memory and at least one processor.

The coordinator node 1000 may include a transmission/reception module 1100, a cache module 1200, and a control unit 1300.

The cache module 1200 may store data. For example, the cache module 1200 may store data read from the persistent storage medium 3000. The cache module 1200 may be implemented by one or more memories.

Herein, the memory as a primary storage device which a processor autonomously accesses may mean a volatile storage device in which when a power supply is turned off, stored information is instantaneously erased, such as random access memories (RAM) such as a dynamic random access memory (DRAM), a static random access memory (SRAM), and the like, but is not limited thereto. The memory may be operated by the processor.

The transmission/reception module 1100 may receive data storage, inquiry and index build, an inquiry request, and the like from a user. Further, the transmission/reception module 1100 may transmit the data and receive the data.

The control unit 1300 of the coordinator node 1000 may include a recovery candidate block deciding unit 1320, a master node deciding unit 1340, and a recovery data acquiring unit 1360. The control unit 1300 of the coordinator node 1000 may be implemented by one processor and implemented by a plurality of processors.

The recovery candidate block deciding unit 1320 may decide at least one recovery candidate block among blocks stored in the persistent storage medium 3000.

The recovery candidate block deciding unit 1320 may read log data stored in the permanent storage medium 3000.

The log data may include various information regarding at least one block.

For example, the log data may include change point-of-time information of the block. For example, the log data may include information regarding a point of time when a specific block is changed.

The log data may include recording point-of-time information of the block. For example, the log data may include information indicating when the specific block is recorded in the persistent storage medium.

The log data may include address information of the block. For example, the log data may include information indicating which part of the persistent storage medium the specific block is recorded but is not limited thereto and may include various information.

The recovery candidate block deciding unit 1320 reads the log data to decide the recovery candidate block. For example, the recovery candidate block deciding unit 1320 may decide the recovery candidate block based on at least some of the change point-of-time information of the block, the recording point-of-time information of the block, and the address information of the block included in the log data but is not limited thereto.

The recovery candidate block deciding unit 1320 may decide the recovery candidate block based on the block address information included in the log data.

For example, the recovery candidate block deciding unit 1320 may read the log data recorded by a node in which a fail occurs and decide at least one recovery candidate block among the blocks stored in the persistent storage medium 3000 based on the block address information included in the log data.

The recovery candidate block deciding unit 1320 may decide the recovery candidate block based on the block change point-of-time information included in the log data.

For example, the recovery candidate block deciding unit 1320 reads the log data to decide a recovery time period of the recovery candidate block. For example, the recovery candidate block deciding unit 1320 reads the change point-of-time information included in the log data to decide a first change point of time and a final change point of time when a recovery is required among a plurality of change points of time and decide as the recovery time period a period between the first change point of time and the final change point of time.

In this case, the recovery candidate block deciding unit 1320 may decide, as the recovery candidate block, blocks where changes which occur during the recovery time period are present.

The recovery candidate block deciding unit 1320 may decide the recovery candidate block by further considering the block recording information included in the log data.

For example, when a point of time indicated by the final change point-of-time information of the block is earlier than a point of time indicated by the recording point-of-time information of the block, the recovery candidate block deciding unit 1320 may not decide the corresponding block as the recovery candidate block.

The recovery candidate block deciding unit 1320 may decide the recovery candidate block by combining the aforementioned methods but is not limited thereto and may decide the recovery candidate block by various methods.

The master node deciding unit 1340 may decide the master node of each of one or more recovery candidate blocks.

The master node deciding unit 1340 may decide the master nodes 2000 of the respective blocks included in the persistent storage medium. For example, the master node deciding unit 1340 may decide the master node 2000 of at least one recovery candidate block among the blocks included in the persistent storage medium.

The master node 2000 means a node that manages the block included in the persistent storage medium. For example, the master node 2000 may manage a lock of a specific block included in the persistent storage medium 3000. Further, the master node 2000 may possess information on a node that possesses a final change state of the block on the cache module 2200.

One master node 2000 may manage one block or a plurality of blocks but is not limited thereto.

The master node deciding unit 1340 may decide the master node of each of one or more recovery candidate blocks by various methods. For example, the master node deciding unit 1340 may decide the master node 2000 of the recovery candidate block based on the block address information of the recovery candidate block.

For example, the master node deciding unit 1340 may acquire the block address information of each recovery candidate block. The master node deciding unit 1340 may acquire the block address information of each recovery candidate block from the log data. Further, the master node deciding unit 1340 inputs the address information of the recovery candidate block in a predetermined function to acquire a result value and decide a node indicated by the result value as the master node 2000 of the recovery candidate block.

The master node deciding unit 1340 may inquire into the master node of each block and decide the master node of each recovery candidate block based on an inquiry result.

In this case, the master node of each block may be predetermined based on the block address information of each block. For example, the master node 2000 of the block may be predetermined as a node indicated by a result value generated by inputting the block address information in a predetermined function.

The transmission/reception module 1100 of the coordinator node 1000 may transmit data associated with the recovery candidate block to the master node 2000 of each of one or more recovery candidate blocks.

For example, the coordinator node 1000 may transmit at least one of the log data of the recovery candidate block, information on the recovery time period of the recovery candidate block, and identification information of the recovery candidate block. However, when the coordinator node 1000 is the master node 2000 of the recovery candidate block, the coordinator node 1000 may not transmit information on the corresponding recovery candidate block to another node.

The master node 2000 may include a transmission/reception module 2100, a cache module 2200, and a control unit 2300. The control unit 2300 may include a recovery target block deciding unit 2320 and a recovery performing unit 2340. The control unit 2300 of the master node 2000 may be implemented by one processor and implemented by a plurality of processors but is not limited thereto.

The transmission/reception module 2100 of the master node 2000 may receive data associated with each of one or more recovery candidate blocks managed by the master node 2000.

For example, the transmission/reception module 2100 of the master node 2000 may receive at least one of information on the recovery time period of each of one or more recovery candidate blocks managed by the master node 2000, identification information of the recovery candidate block, and log data of the recovery candidate block.

The recovery target block deciding unit 2320 of the master node 2000 may decide whether the recovery candidate block is the recovery target block.

The master node 2000 may identify at least one recovery candidate block among blocks managed by the master node 2000. For example, the master node 2000 may identify at least one recovery candidate block based on identification information of the recovery candidate block received from the coordinator node 1000.

The recovery target block deciding unit 2320 may decide the recovery target block among one or more recovery candidate blocks.

In this case, the master node 2000 determines whether one or more respective recovery candidate blocks are to be recovered to decide at least one recovery target block among one or more recovery candidate blocks. Further, when the master node 2000 determines whether one or more respective recovery candidate blocks are to be recovered, in the case where the recovery target block is not present, the master node 2000 may not decide the recovery target block.

For example, the recovery target block deciding unit 2320 may decide whether the recovery candidate block is the recovery target block according to whether a change which needs to be reflected to the recovery candidate block has already been reflected to the recovery candidate block. In this case, the recovery target block deciding unit 2320 may refer to the information on the recovery time period.

For example, the recovery target block deciding unit 2320 may decide the recovery candidate block as the recovery target block when a change not reflected to the recovery candidate block is present among changes which occur within the recovery time period. Further, the recovery target block deciding unit 2320 may not decide the recovery candidate block as the recovery target block when the change not reflected to the recovery candidate block is not present among the changes which occur within the recovery time period.

As another example, the recovery target block deciding unit 2320 may decide whether the recovery candidate block is the recovery target block based on whether information on the change which needs to be reflected to the recovery candidate block is present in another node.

For example, the recovery target block deciding unit 2320 may decide that the recovery candidate block is not the recovery target block when the information on the change which needs to be reflected to the recovery candidate block is present in another node. Further, the recovery target block deciding unit 2320 may decide the recovery candidate block as the recovery target block when the information on the change which needs to be reflected to the recovery candidate block is not present in another node.

The recovery target block deciding unit 2320 may decide whether the recovery candidate block is the recovery target block based on whether the change which needs to be reflected to the recovery candidate block has already been reflected to the recovery candidate block and whether the information on the change which needs to be reflected to the recovery candidate block is present in another node.

For example, the recovery target block deciding unit 2320 may decide the recovery candidate block as the recovery target block when the change not reflected to the recovery candidate block is present among the changes which occur within the recovery time period and the change is not present in another node.

The recovery target block deciding unit 2320 may distribute a plurality of decided recovery target blocks to a plurality of recovery performing units 2340, respectively so that each of the plurality of recovery performing units 2340 performs the recovery.

For example, when the number of recovery performing units 2340 is three and the number of recovery target blocks is five, the recovery target block deciding unit 2320 may distribute two recovery target blocks to a first recovery performing unit 2340, distribute two recovery target blocks to a second recovery performing unit 2340, and distribute one recovery target block to a third recovery performing unit 2340. Further, the recovery target block deciding unit 2320 may distribute three recovery target blocks to the first recovery performing unit 2340 and distribute two recovery target blocks to the second recovery performing unit 2340 but is not limited thereto.

In this case, the recovery target block deciding unit 2320 may distribute the recovery target block based on a physical position at which the plurality of recovery target blocks are stored on the persistent storage medium 3000.

For example, the recovery target block deciding unit 2320 may distribute recovery target blocks positioned adjacent to each other to the same recovery performing unit 2340.

A criterion of the distribution is just one exemplary embodiment and the recovery target block deciding unit 2320 of the present disclosure is not limited to the aforementioned example and may distribute the recovery target blocks based on various criteria.

According to an exemplary embodiment of the present disclosure, the recovery target blocks are distributed to the recovery performing unit 2340 by the unit of the block, and as a result, when the plurality of recovery performing units 2340 performs the recovery, dependency among the plurality of recovery performing units 2340 may be removed, thereby increasing efficiency of the recovery of the recovery target block.

According to an additional exemplary embodiment of the present disclosure, when the information on the change which needs to be reflected to the recovery candidate block is present in another node, the master node 2000 may allow the other node to reflect the change to the recovery candidate block.

For example, the master node 2000 may transmit data to command another node to reflect the change to the recovery candidate block.

The transmission/reception module 2100 of the master node 2000 may selectively transmit a decision result of the recovery target block deciding unit 2320 to the coordinator node 1000. For example, the master node 2000 may transmit the decision result of the recovery target block deciding unit 2320 to the coordinator node 1000 or not transmit the decision result to the coordinator node 1000 but is not limited thereto.

According to an exemplary embodiment of the present disclosure, the recovery data acquiring unit 1360 of the coordinator node 1000 re-reads the log data stored in the persistent storage medium 3000 to acquire the log data associated with one or more respective recovery target blocks. Further, the transmission/reception module 1100 of the coordinator node 1000 may transmit the log data associated with one or more respective recovery target blocks to the master node 2000.

According to an exemplary embodiment of the present disclosure, the recovery data acquiring unit 1360 of the coordinator node 1000 re-reads the log data stored in the persistent storage medium 3000 to acquire the log data associated with one or more respective recovery target blocks. Further, the transmission/reception module 1100 of the coordinator node 1000 may transmit the log data associated with one or more respective recovery candidate blocks to the respective master nodes 2000.

According to another exemplary embodiment of the present disclosure, the recovery data acquiring unit 1360 of the coordinator node 1000 re-reads the log data stored in the persistent storage medium 3000 to acquire the recovery data associated with one or more respective recovery target blocks. Further, the transmission/reception module 1100 of the coordinator node 1000 may transmit the recovery data associated with one or more respective recovery target blocks to the respective master nodes 2000.

According to another exemplary embodiment of the present disclosure, the recovery data acquiring unit 1360 of the coordinator node 1000 re-reads the log data stored in the persistent storage medium 3000 to acquire recovery data associated with one or more respective recovery candidate blocks. Further, the transmission/reception module 1100 of the coordinator node 1000 may transmit the recovery data associated with one or more respective recovery candidate blocks to the respective master nodes 2000.

Herein, the recovery data means data associated with changes which need to be reflected to the recovery target block. For example, the recovery data may include information on changes which are not reflected to the recovery target block among changes which occur during the recovery time period.

In this case, when the coordinator node 1000 and the master node 2000 are the same as each other, the transmission/reception module 1100 of the coordinator node 1000 may not transmit the log data of the recovery target block, the recovery data of the recovery target block, the log data of the recovery candidate block, the recovery data of the recovery candidate block, or a combination thereof.

The transmission/reception module 2100 of the master node 2000 may receive at least one of the log data of the recovery target block, the recovery data of the recovery target block, the log data of the recovery candidate block, and the log data of the recovery candidate block.

The recovery performing unit 2340 of the master node 2000 may perform the recovery based on the received log data of the recovery target block, the received recovery data of the recovery target block, or a combination thereof.

For example, the recovery performing unit 2340 may reflect the changes which have not yet been reflected to the recovery target block recorded in the persistent storage medium.

The recovery performing unit 2340 of the master node 2000 may extract the log data of the recovery target block, the recovery data of the recovery target block, or a combination thereof from the received log data of the recovery candidate block, the received recovery data of the recovery candidate block, or a combination thereof. Further, the recovery performing unit 2340 of the master node 2000 may perform the recovery based on the extracted data.

When the recovery performing unit 2340 of the master node 2000 recovers the recovery target block, the master node 2000 may decide as a first group one or more recovery target blocks positioned adjacent to each other in the persistent storage medium and recover the determined one or more recovery target blocks included in the first group during the same time period. The master node 2000 recovers one or more recovery target blocks positioned adjacent to each other in the persistent storage medium together to increase the efficiency of the recovery.

The master node 2000 may include a plurality of recovery performing units 2340 and recover a plurality of recovery target blocks in parallel.

A plurality of master nodes 2000 may recover the recovery target blocks in parallel.

The master node 2000 may restrict accesses of other nodes to the recovery target blocks while the recovery target block is recovered. For example, the master node 2000 may not restrict the accesses of other nodes to all tables including the recovery target block but restrict the accesses of other nodes only to the corresponding recovery target block which is recovered while the recovery target blocks are recovered.

According to an exemplary embodiment of the present disclosure, the coordinator node 1000 reads the log data to decide one or more recovery candidate blocks and decide the master nodes of one or more respective recovery candidate blocks. The master node 2000 may decide at least one recovery target block among the decided one or more recovery candidate blocks. Thereafter, the coordinator node 1000 re-reads the log data to acquire the recovery data of the recovery target block and the master node 2000 may recover the recovery target block by using the recovery data. In this case, when a plurality of master nodes 2000 is provided, the respective master nodes 2000 may recover the recovery target block managed by the master node 2000.

According to an exemplary embodiment of the present disclosure, the coordinator node 1000 repeatedly reads the log data, and as a result, the plurality of respective master nodes may recover the recovery target block in parallel and recovery efficiency of the block stored in the persistent storage medium 3000 may be increased.

In this case, the recovery target blocks are recovered by the plurality of nodes by the unit of the block, and as a result, when the plurality of nodes performs the recovery, the dependency among the plurality of nodes may be removed, thereby increasing efficiency of the recovery of the recovery target blocks.

Since a node that modifies the corresponding block for each block may be fixed to the master node 2000, the coordinator node 1000 and the master node 2000 transmit/receive only data (e.g., the log data or the recovery data) associated with the recovery without transmitting/receiving the block through the network, and as a result, a data transmission quantity of the network may be decreased.

Since the plurality of nodes participates in the recovery and one block is present only in one buffer, a buffer cache hit rate increases, and as a result, a recovery speed may be further increased.

According to another exemplary embodiment of the present disclosure, the coordinator node 1000 may include a plurality of control units 1300. The coordinator node 1000 may perform the aforementioned operations through the plurality of control units 1300 in parallel.

According to another exemplary embodiment of the present disclosure, the master node 2000 may include a plurality of control units 2300. The master node 2000 may perform the aforementioned operations through the plurality of control units 2300 in parallel.

Figure 3:
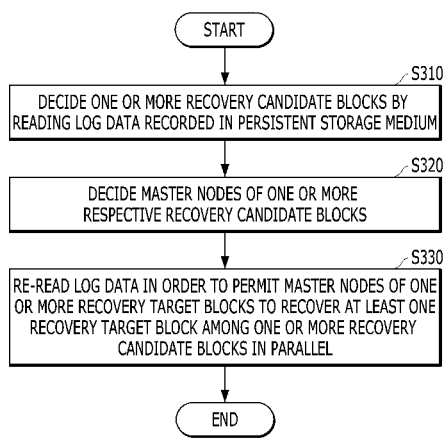
FIG. 3 is a diagram for describing a method in which a database system recovers a block stored in a persistent storage medium according to an exemplary embodiment of the present disclosure.

FIG. 3 is a diagram for describing a method in which a database system recovers a block stored in a persistent storage medium according to an exemplary embodiment of the present disclosure.

In step S310, the coordinator node 1000 may decide at least one recovery candidate block among the blocks stored in the persistent storage medium 3000.

The coordinator node 1000 may read the log data stored in the persistent storage medium 3000.

The coordinator node 1000 reads the log data to decide the recovery candidate block. For example, the coordinator node 1000 may decide the recovery candidate block based on at least some of the change point-of-time information of the block, the recording point-of-time information of the block, and the address information of the block included in the log data but is not limited thereto.

The coordinator node 1000 may decide the recovery candidate block based on the block address information included in the log data.

For example, the coordinator node 1000 may read the log data recorded by a node in which a fail occurs and decide at least one recovery candidate block among the blocks stored in the persistent storage medium 3000 based on the block address information included in the log data.

The coordinator node 1000 may decide the recovery candidate block based on the block change point-of-time information included in the log data.

For example, the coordinator node 1000 reads the log data to decide the recovery time period of the recovery candidate block. For example, the coordinator node 1000 reads the change point-of-time information included in the log data to decide the first change point of time and the final change point of time when the recovery is required among the plurality of change points of time and decide as the recovery time period the period between the first change point of time and the final change point of time.

In this case, the coordinator node 1000 may decide, as the recovery candidate blocks, blocks where changes which occur during the recovery time period are present.

Further, the coordinator node 1000 may decide the recovery candidate block by further considering the block recording information included in the log data.

For example, when a point of time indicated by the final change point-of-time information of the block is earlier than a point of time indicated by the recording point-of-time information of the block, the coordinator node 1000 may not decide the corresponding block as the recovery candidate block.

The coordinator node 1000 may decide the recovery candidate block by combining the aforementioned methods but is not limited thereto and may decide the recovery candidate block by various methods.

In step S320, the coordinator node 1000 may decide the master node of each of one or more recovery candidate blocks.

The coordinator node 1000 may decide the master nodes 2000 of the respective blocks included in the persistent storage medium. For example, the coordinator node 1000 may decide the master node 2000 of at least one recovery candidate block among the blocks included in the persistent storage medium.

The master node 2000 means a node that manages the block included in the persistent storage medium. For example, the master node 2000 may manage a lock of a specific block included in the persistent storage medium 3000. Further, the master node 2000 may possess information on a node that possesses a final change state of the block on the cache module 2200.

One master node 2000 may manage one block or a plurality of blocks but is not limited thereto.

The coordinator node 1000 may decide the master node of each of one or more recovery candidate blocks by various methods. For example, the coordinator node 1000 may decide the master node 2000 of the recovery candidate block based on the block address information of the recovery candidate block.

For example, the coordinator node 1000 may acquire the block address information of each recovery candidate block. The coordinator node 1000 may acquire the block address information of each recovery candidate block from the log data and input the address information of the recovery candidate block in a predetermined function (e.g., a predetermined hash function) to acquire a result value thereof and decide a node indicated by the result value as the master node 2000 of the recovery candidate block.

The coordinator node 1000 may inquire into the master node of each block and decide the master node of each recovery candidate block based on an inquiry result.

In this case, the master node of each block may be predetermined based on the block address information of each block. For example, the master node 2000 of the block may be predetermined as a node indicated by a result value generated by inputting the block address information in a predetermined function.

The coordinator node 1000 may transmit data associated with the recovery candidate block to the master node 2000 of each of one or more recovery candidate blocks.

For example, the coordinator node 1000 may transmit at least one of the log data of the recovery candidate block, information on the recovery time period of the recovery candidate block, and identification information of the recovery candidate block. However, when the coordinator node 1000 is the master node 2000 of the recovery candidate block, the coordinator node 1000 may not transmit information on the corresponding recovery candidate block to another node.

The master node 2000 may decide at least one recovery target block among one or more recovery candidate blocks.

The master node 2000 may identify at least one recovery candidate block among blocks managed by the master node 2000. For example, the master node 2000 may identify at least one recovery candidate block based on identification information of the recovery candidate block received from the coordinator node 1000.

The master node 2000 may decide the recovery target block among one or more recovery candidate blocks.

In this case, the master node 2000 determines whether one or more respective recovery candidate blocks are to be recovered to decide at least one recovery target block among one or more recovery candidate blocks. When the master node 2000 determines whether one or more respective recovery candidate blocks are to be recovered, in the case where the recovery target block is not present, the master node 2000 may not decide the recovery target block.

For example, the master node 2000 may decide whether the recovery candidate block is the recovery target block according to whether a change which needs to be reflected to the recovery candidate block has already been reflected to the recovery candidate block. In this case, the master node 2000 may refer to the information on the recovery time period.

For example, the master node 2000 may decide the recovery candidate block as the recovery target block when a change not reflected to the recovery candidate block is present among changes which occur within the recovery time period. Further, the master node 2000 may not decide the recovery candidate block as the recovery target block when the change not reflected to the recovery candidate block is not present among the changes which occur within the recovery time period.

As another example, the master node 2000 may decide whether the recovery candidate block is the recovery target block based on whether information on the change which needs to be reflected to the recovery candidate block is present in another node.

For example, the master node 2000 may decide that the recovery candidate block is not the recovery target block when the information on the change which needs to be reflected to the recovery candidate block is present in another node. Further, the master node 2000 may decide the recovery candidate block as the recovery target block when the information on the change which needs to be reflected to the recovery candidate block is not present in another node.

The master node 2000 may decide whether the recovery candidate block is the recovery target block based on whether the change which needs to be reflected to the recovery candidate block has already been reflected to the recovery candidate block and whether the information on the change which needs to be reflected to the recovery candidate block is present in another node.

For example, the master node 2000 may decide the recovery candidate block as the recovery target block when the change not reflected to the recovery candidate block is present among the changes which occur within the recovery time period and the change is not present in another node.

The master node 2000 may distribute a plurality of decided recovery target blocks to a plurality of recovery performing units 2340, respectively so that each of the plurality of recovery performing units 2340 performs the recovery.

For example, when the number of recovery performing units 2340 is three and the number of recovery target blocks is five, the master node 2000 may distribute two recovery target blocks to a first recovery performing unit 2340, distribute two recovery target blocks to a second recovery performing unit 2340, and one recovery target block to a third recovery performing unit 2340. Further, the master node 2000 may distribute three recovery target blocks to the first recovery performing unit 2340 and distribute two recovery target blocks to the second recovery performing unit 2340 but is not limited thereto.

In this case, the master node 2000 may distribute the recovery target block based on a physical position at which the plurality of recovery target blocks are stored on the persistent storage medium 3000.

For example, the master node 2000 may distribute target blocks positioned adjacent to each other to the same recovery performing unit 2340.

A criterion of the distribution is just one exemplary embodiment and the master node 2000 of the present disclosure is not limited to the aforementioned example and may distribute the recovery target blocks based on various criteria.

According to an exemplary embodiment of the present disclosure, the recovery target blocks are distributed to the recovery performing unit 2340 by the unit of the block, and as a result, when the plurality of recovery performing units 2340 performs the recovery, dependency among the plurality of recovery performing units 2340 may be removed, thereby increasing efficiency of the recovery of the recovery target block.

According to an additional exemplary embodiment of the present disclosure, when the information on the change which needs to be reflected to the recovery candidate block is present in another node, the master node 2000 may allow the other node to reflect the change to the recovery candidate block.

For example, the master node 2000 may transmit data to command another node so that the other node reflects the change to the recovery candidate block.

The master node 2000 may selectively transmit a decision result for the recovery target block to the coordinator node 1000. For example, the master node 2000 may transmit the decision result for the recovery target block to the coordinator node 1000 or not transmit the decision result to the coordinator node 1000 but is not limited thereto.

In step S330, the coordinator node 1000 may re-read the log data in order to permit the master nodes of one or more respective recovery target blocks to recover at least one recovery target block among one or more recovery candidate blocks in parallel.

The transmission/reception module 2100 of the master node 2000 may selectively transmit a decision result of the recovery target block deciding unit 2320 to the coordinator node 1000. For example, the master node 2000 may transmit the decision result of the recovery target block deciding unit 2320 to the coordinator node 1000 or not transmit the decision result to the coordinator node 1000 but is not limited thereto.

According to an exemplary embodiment of the present disclosure, the coordinator node 1000 re-reads the log data stored in the persistent storage medium 3000 to acquire the log data associated with one or more respective recovery target blocks. Further, the coordinator node 1000 may transmit the log data associated with one or more respective recovery target blocks to the respective master nodes 2000.

According to an exemplary embodiment of the present disclosure, the coordinator node 1000 re-reads the log data stored in the persistent storage medium 3000 to acquire the log data associated with one or more respective recovery candidate blocks. Further, the coordinator node 1000 may transmit the log data associated with one or more respective recovery candidate blocks to the respective master nodes 2000.

According to another exemplary embodiment of the present disclosure, the coordinator node 1000 re-reads the log data stored in the persistent storage medium 3000 to acquire the recovery data associated with one or more respective recovery target blocks. Further, the coordinator node 1000 may transmit the recovery data associated with one or more respective recovery target blocks to the respective master nodes 2000.

According to another exemplary embodiment of the present disclosure, the coordinator node 1000 re-reads the log data stored in the persistent storage medium 3000 to acquire the recovery data associated with one or more respective recovery candidate blocks. Further, the coordinator node 1000 may transmit the recovery data associated with one or more respective recovery candidate blocks to the respective master nodes 2000.

The coordinator node 1000 is not limited to the aforementioned example and may transmit various types of data associated with the recovery of the recovery target block.

Herein, the recovery data means data associated with changes which need to be reflected to the recovery target block. For example, the recovery data may include information on changes which are not reflected to the recovery target block among changes which occur during the recovery time period.

In this case, when the coordinator node 1000 and the master node 2000 are the same as each other, the coordinator node 1000 may not transmit the log data of the recovery target block, the recovery data of the recovery target block, the log data of the recovery candidate block, the recovery data of the recovery candidate block, or a combination thereof.

The master node 2000 may receive at least one of the log data of the recovery target block, the recovery data of the recovery target block, the log data of the recovery candidate block, and the log data of the recovery candidate block.

The master node 2000 may recover the recovery target block. For example, the master node 2000 may recover the recovery target block based on at least one of the log data of the recovery target block and the recovery data of the recovery target block.

For example, the master node 2000 may reflect the changes which have not yet been reflected to the recovery target block recorded in the persistent storage medium.

The master node 2000 may extract the log data of the recovery target block, the recovery data of the recovery target block, or a combination thereof from the received log data of the recovery candidate block, the received recovery data of the recovery candidate block, or a combination thereof In addition, the master node 2000 may perform the recovery based on the extracted data.

When the master node 2000 recovers the recovery target block, the master node 2000 may decide as a first group one or more recovery target blocks positioned adjacent to each other in the persistent storage medium and recover the determined one or more recovery target blocks included in the first group during the same time period. The master node 2000 recovers one or more recovery target blocks positioned adjacent to each other in the persistent storage medium together to increase the efficiency of the recovery.

The master node 2000 may recover a plurality of recovery target blocks in parallel.

A plurality of master nodes 2000 may recover the recovery target blocks in parallel.

The master node 2000 may restrict accesses of other nodes to the recovery target blocks while the recovery target block is recovered. For example, the master node 2000 may not restrict the accesses of other nodes to all the tables including the recovery target block and restrict the accesses of other nodes only to the corresponding recovery target block which is recovered while the recovery target blocks are recovered.

According to an exemplary embodiment of the present disclosure, the coordinator node 1000 reads the log data to decide one or more recovery candidate blocks and decide the master nodes of one or more respective recovery candidate blocks. The master node 2000 may decide at least one recovery target block among the decided one or more recovery candidate blocks. The coordinator node 1000 re-reads the log data to acquire the recovery data of the recovery target block and the master node 2000 may recover the recovery target block by using the recovery data. In this case, when the plurality of master nodes 2000 is provided, the respective master nodes 2000 may recover the recovery target block managed by the master node 2000.

According to an exemplary embodiment of the present disclosure, the coordinator node 1000 repeatedly reads the log data, and as a result, the plurality of respective master nodes may recover the recovery target block in parallel and recovery efficiency of the block stored in the persistent storage medium 3000 may be increased.

Figure 4:
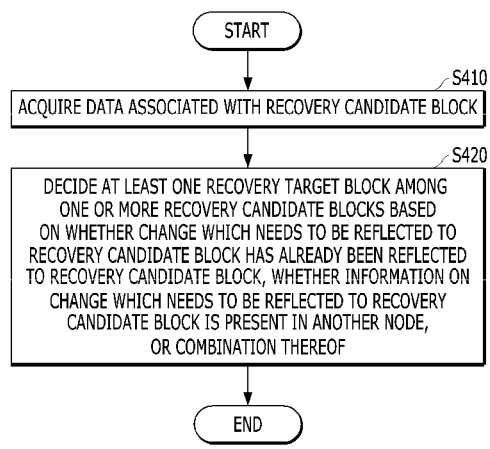
FIG. 4 is a diagram for describing a method in which a master node determines a recovery target block.

FIG. 4 is a diagram for describing a method in which a master node determines a recovery target block.

The master node 2000 may decide at least one recovery candidate block among blocks managed by the master node 2000. For example, the master node 2000 may decide at least one recovery candidate block based on information received from the coordinator node 1000. As another example, when the master node 2000 and the coordinator node 1000 are the same as each other, the master node 2000 may decide at least one recovery candidate block based on the log data stored in the persistent storage medium 3000.

In step S410, the master node 2000 may acquire data associated with the recovery candidate block.

For example, the master node 2000 reads the log data of the recovery candidate block to acquire the data associated with the recovery candidate block and acquire the data associated with the recovery candidate block from the coordinator node 1000 but is not limited thereto.

The data associated with the recovery candidate block may include at least one of the recording point-of-time information of the recovery candidate block, the change point-of-time information of the recovery candidate block, and the address information of the recovery candidate block but is not limited thereto.

The change point-of-time information of the recovery candidate block means information on a point of time when the recovery candidate block is changed.

The recording point-of-time information of the recovery candidate block means information indicating when the recovery candidate block is recorded in the persistent storage medium.

The address information of the recovery candidate block means information indicating in which part of the persistent storage medium the recovery candidate block is recorded.

The master node 2000 acquires information associated with the acquired recovery candidate block to identify at least one recovery candidate block among the blocks managed by the master node 2000. For example, the master node 2000 may identify at least one recovery candidate block based on the address information of the recovery candidate block received from the coordinator node 1000.

In step S420, the master node 2000 may decide at least one recovery target block among one or more recovery candidate blocks based on whether the change which needs to be reflected to the recovery candidate block has already been reflected to the recovery candidate block, whether the information on the change which needs to be reflected to the recovery candidate block is present in another node, a combination thereof.

In this case, the master node 2000 determines whether one or more respective recovery candidate blocks are to be recovered to decide at least one recovery target block among one or more recovery candidate blocks.

For example, the master node 2000 may decide whether the recovery candidate block is the recovery target block according to whether a change which needs to be reflected to the recovery candidate block has already been reflected to the recovery candidate block. In this case, the master node 2000 may refer to the information on the recovery time period.

For example, the master node 2000 may decide the recovery candidate block as the recovery target block when a change not reflected to the recovery candidate block is present among changes which occur within the recovery time period. Further, the master node 2000 may not decide the recovery candidate block as the recovery target block when the change not reflected to the recovery candidate block is not present among the changes which occur within the recovery time period.

As another example, the master node 2000 may decide whether the recovery candidate block is the recovery target block based on whether information on the change which needs to be reflected to the recovery candidate block is present in another node.

For example, the master node 2000 may decide that the recovery candidate block is not the recovery target block when the information on the change which needs to be reflected to the recovery candidate block is present in another node. Further, the master node 2000 may decide the recovery candidate block as the recovery target block when the information on the change which needs to be reflected to the recovery candidate block is not present in another node.

The master node 2000 may decide whether the recovery candidate block is the recovery target block based on whether the change which needs to be reflected to the recovery candidate block has already been reflected to the recovery candidate block and whether the information on the change which needs to be reflected to the recovery candidate block is present in another node.

For example, the master node 2000 may decide the recovery candidate block as the recovery target block when the change not reflected to the recovery candidate block is present among the changes which occur within the recovery time period and the change is not present in another node.

According to an additional exemplary embodiment of the present disclosure, when the information on the change which needs to be reflected to the recovery candidate block is present in another node, the master node 2000 may allow the other node to reflect the change to the recovery candidate block.

For example, the master node 2000 may transmit data to command another node so that the other node reflects the change to the recovery candidate block.

According to an exemplary embodiment of the present disclosure, the master node 2000 may recover the plurality of recovery target blocks in parallel. For example, the master node 2000 may distribute a plurality of decided recovery target blocks to a plurality of recovery performing units 2340, respectively so that the plurality of respective recovery performing units 2340 perform the recovery.

For example, when the number of recovery performing units 2340 is three and the number of recovery target blocks is five, the recovery target block deciding unit 2320 may distribute two recovery target blocks to a first recovery performing unit 2340, distribute two recovery target blocks to a second recovery performing unit 2340, and one recovery target block to a third recovery performing unit 2340. Further, the master node 2000 may distribute three recovery target blocks to the first recovery performing unit 2340 and distribute two recovery target blocks to the second recovery performing unit 2340 but is not limited thereto.

In this case, the master node 2000 may distribute the recovery target block based on a physical position at which the plurality of recovery target blocks is stored on the persistent storage medium 3000.

For example, the master node 2000 may distribute target blocks positioned adjacent to each other to the same recovery performing unit 2340.

A criterion of the distribution is just one exemplary embodiment and the master node 2000 of the present disclosure is not limited to the aforementioned example and may distribute the recovery target blocks based on various criteria.

According to an exemplary embodiment of the present disclosure, the recovery target blocks are distributed to the recovery performing unit 2340 by the unit of the block, and as a result, when the plurality of recovery performing units 2340 performs the recovery, dependency among the plurality of recovery performing units 2340 may be removed, thereby increasing efficiency of the recovery of the recovery target block.

Figure 5:
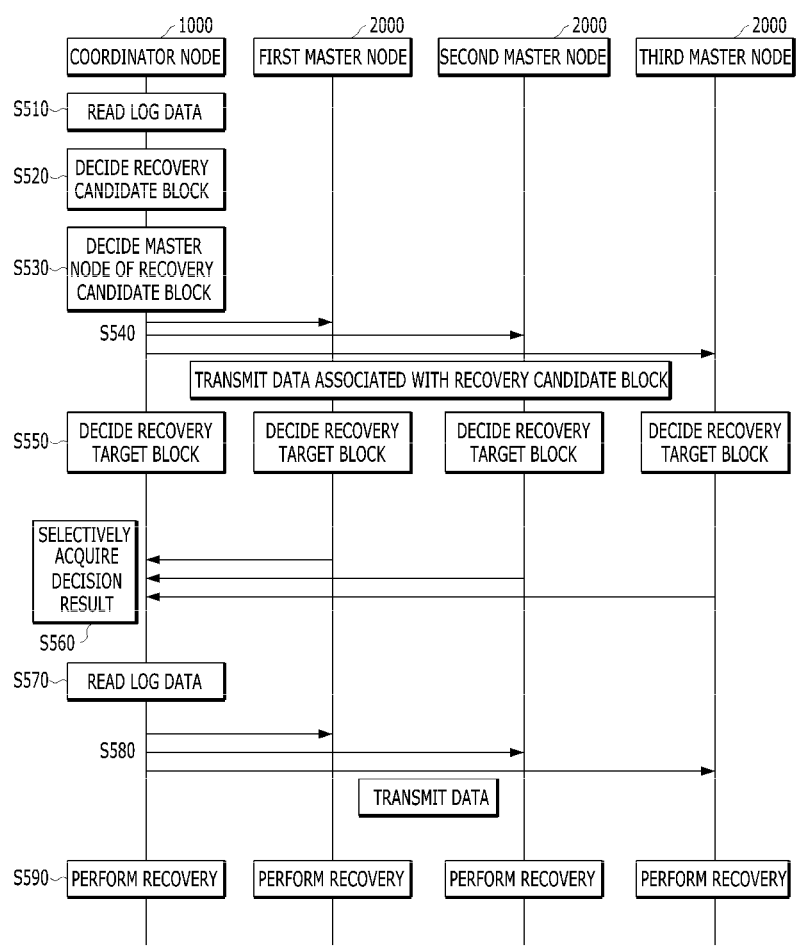
FIG. 5 is a flowchart for describing a method for recovering data according to an exemplary embodiment of the present disclosure.

FIG. 5 is a flowchart for describing a method for recovering data according to an exemplary embodiment of the present disclosure.

In step S510, the coordinator node 1000 may read the log data.

For example, the coordinator node 1000 may read the log data stored in the persistent storage medium 3000. Further, the coordinator node 1000 may read log data received from an external device and read log data that is present in the external device but is not limited thereto.

In this case, the coordinator node 1000 may include a plurality of threads. The thread means one task unit which independently processes a task. For example, the plurality of respective threads may independently perform one task.

The plurality of threads included in the coordinator node 1000 may read the log data in parallel. For example, the coordinator node 1000 may distribute the log data so that the plurality of respective threads may read the log data. Further, the plurality of respective threads may read the independently distributed log data.

The coordinator node 1000 distributes the log data to the plurality of threads to remove dependency among the plurality of threads. Further, the plurality of respective threads read the log data without being influenced by each other to increase reading efficiency of the log data.

In step S520, the coordinator node 1000 may decide at least one recovery candidate block among the blocks stored in the persistent storage medium 3000.

The coordinator node 1000 reads the log data to decide the recovery candidate block. For example, the coordinator node 1000 may decide the recovery candidate block based on at least some of the change point-of-time information of the block, the recording point-of-time information of the block, and the address information of the block included in the log data but is not limited thereto.

The coordinator node 1000 may decide the recovery candidate block based on the block address information included in the log data.

For example, the coordinator node 1000 may read the log data recorded by a node in which a fail occurs and decide at least one recovery candidate block among the blocks stored in the persistent storage medium 3000 based on the block address information included in the log data.

The coordinator node 1000 may decide the recovery candidate block based on the block change point-of-time information included in the log data.

For example, the coordinator node 1000 reads the log data to decide the recovery time period of the recovery candidate block. For example, the coordinator node 1000 reads the change point-of-time information included in the log data to decide the first change point of time and the final change point of time when the recovery is required among the plurality of change points of time and decide as the recovery time period the period between the first change point of time and the final change point of time.

In this case, the coordinator node 1000 may decide, as the recovery candidate blocks, blocks where changes which occur during the recovery time period are present.

Further, the coordinator node 1000 may decide the recovery candidate block by further considering the block recording information included in the log data.

For example, when a point of time indicated by the final change point-of-time information of the block is earlier than a point of time indicated by the recording point-of-time information of the block, the coordinator node 1000 may not decide the corresponding block as the recovery candidate block.

The coordinator node 1000 may decide the recovery candidate block by combining the aforementioned methods but is not limited thereto and may decide the recovery candidate block by various methods.

In this case, the plurality of threads included in the coordinator node 1000 may decide the recovery candidate block in parallel. For example, the coordinator node 1000 may distribute the log data so that the plurality of respective threads read the log data. Further, the plurality of threads reads the independently distributed log data to decide the recovery candidate block.

The coordinator node 1000 distributes the log data to the plurality of threads to remove dependency among the plurality of threads. Further, the plurality of respective threads decide the recovery candidate block without being influenced by each other to increase efficiency of decision of the recovery candidate block.

In step S530, the coordinator node 1000 may decide the master node of each of one or more recovery candidate blocks.

The coordinator node 1000 may decide the master nodes 2000 of the respective blocks included in the persistent storage medium. For example, the coordinator node 1000 may decide the master node 2000 of at least one recovery candidate block among the blocks included in the persistent storage medium.

The master node 2000 means a node that manages the block included in the persistent storage medium. For example, the master node 2000 may manage a lock of a specific block included in the persistent storage medium 3000. Further, the master node 2000 may possess information on a node that possesses a final change state of the block on the cache module 2200.

One master node 2000 may manage one block or a plurality of blocks but is not limited thereto.

The coordinator node 1000 may decide the master node of each of one or more recovery candidate blocks by various methods. For example, the coordinator node 1000 may decide the master node 2000 of the recovery candidate block based on the block address information of the recovery candidate block.

For example, the coordinator node 1000 may acquire the block address information of each recovery candidate block. The coordinator node 1000 may acquire the block address information of each recovery candidate block from the log data and input the address information of the recovery candidate block in a predetermined function (e.g., a predetermined hash function) to acquire a result value and decide a node indicated by the result value as the master node 2000 of the recovery candidate block.

In step S520, the coordinator node 1000 may transmit data associated with the recovery candidate block to the master node 2000 of each of one or more recovery candidate blocks.

For example, the coordinator node 1000 may transmit at least one of the log data of the recovery candidate block, information on the recovery time period of the recovery candidate block (alternatively, information on the change point-of-time information of the recovery candidate block), and identification information of the recovery candidate block. However, when the coordinator node 1000 is the master node 2000 of the recovery candidate block, the coordinator node 1000 may not transmit information on the corresponding recovery candidate block to another node.

In step S550, the master node 2000 may decide at least one recovery target block among one or more recovery candidate blocks.

The master node 2000 may identify at least one recovery candidate block among blocks managed by the master node 2000. For example, the master node 2000 may identify at least one recovery candidate block based on identification information of the recovery candidate block received from the coordinator node 1000.

The master node 2000 may decide at least one recovery target block among one or more recovery candidate blocks.

In this case, the master node 2000 determines whether one or more respective recovery candidate blocks are to be recovered to decide at least one recovery target block among one or more recovery candidate blocks.

For example, the master node 2000 may decide whether the recovery candidate block is the recovery target block according to whether a change which needs to be reflected to the recovery candidate block has already been reflected to the recovery candidate block. In this case, the master node 2000 may refer to the information on the recovery time period.

For example, the master node 2000 may decide the recovery candidate block as the recovery target block when a change not reflected to the recovery candidate block is present among changes which occur within the recovery time period. Further, the master node 2000 may not decide the recovery candidate block as the recovery target block when the change not reflected to the recovery candidate block is not present among the changes which occur within the recovery time period.

As another example, the master node 2000 may decide whether the recovery candidate block is the recovery target block based on whether information on the change which needs to be reflected to the recovery candidate block is present in another node.

For example, the master node 2000 may decide that the recovery candidate block is not the recovery target block when the information on the change which needs to be reflected to the recovery candidate block is present in another node. Further, the master node 2000 may decide the recovery candidate block as the recovery target block when the information on the change which needs to be reflected to the recovery candidate block is not present in another node.

The master node 2000 may decide whether the recovery candidate block is the recovery target block based on whether the change which needs to be reflected to the recovery candidate block has already been reflected to the recovery candidate block and whether the information on the change which needs to be reflected to the recovery candidate block is present in another node.

For example, the master node 2000 may decide the recovery candidate block as the recovery target block when the change not reflected to the recovery candidate block is present among the changes which occur within the recovery time period and the change is not present in another node.

The master node 2000 may include the plurality of threads. The master node 2000 may distribute a plurality of decided recovery target blocks to the plurality of threads, respectively so that the plurality of respective recovery performing units 2340 perform the recovery.

For example, when the number of threads is three and the number of recovery target blocks is five, the master node 2000 may distribute two recovery target blocks to a first thread, distribute two recovery target blocks to a second thread, and one recovery target block to a third thread. Further, the master node 2000 may distribute three recovery target blocks to the first thread and distribute two recovery target blocks to the second thread but is not limited thereto.

In this case, the master node 2000 may distribute the recovery target block based on a physical position at which the plurality of recovery target blocks is stored on the persistent storage medium 3000.

For example, the master node 2000 may distribute target blocks positioned adjacent to each other to the same thread.

A criterion of the distribution is just one exemplary embodiment and the recovery target block deciding unit 2320 is not limited to the aforementioned example and may distribute the recovery target blocks based on various criteria.

According to an exemplary embodiment of the present disclosure, the recovery target blocks are distributed to the threads by the unit of the block, and as a result, when the plurality of threads performs the recovery, dependency among the plurality of threads may be removed, thereby increasing the efficiency of the recovery of the recovery target block.

According to an additional exemplary embodiment of the present disclosure, when the information on the change which needs to be reflected to the recovery candidate block is present in another node, the master node 2000 may allow the other node to reflect the change to the recovery candidate block.

For example, the master node 2000 may transmit data to command another node so that the other node reflects the change to the recovery candidate block.

In step S560, the coordinator node 1000 may selectively acquire a decision result for the recovery target block. For example, the coordinator node 1000 may acquire the decision result for the recovery target block or not acquire the decision result.

In step S570, the coordinator node 1000 may re-read the log data in order to permit the master nodes of one or more respective recovery target blocks to recover at least one recovery target block among one or more recovery candidate blocks in parallel.

The coordinator node 1000 re-reads the log data stored in the persistent storage medium 3000 to acquire the log data associated with one or more respective recovery target blocks.

The coordinator node 1000 re-reads the log data stored in the persistent storage medium 3000 to acquire the recovery data of one or more respective recovery target blocks.

The coordinator node 1000 re-reads the log data stored in the persistent storage medium 3000 to acquire the log data of one or more respective recovery candidate blocks.

The coordinator node 1000 re-reads the log data stored in the persistent storage medium 3000 to acquire the recovery data of one or more respective recovery candidate blocks.

Herein, the recovery data means data associated with changes which need to be reflected to the recovery target block. For example, the recovery data may include information on changes which are not reflected to the recovery target block among changes which occur during the recovery time period.

In step S580, the coordinator node 1000 may transmit the acquired log data of the recovery target block, the acquired recovery data of the recovery target block, the acquired log data of the recovery candidate block, the acquired recovery data of the recovery candidate block, or a combination thereof to the master nodes 2000 of the respective blocks.

In this case, when the coordinator node 1000 and the master node 2000 are the same as each other, the coordinator node 1000 may not transmit data associated with the recovery.

In step S590, the master node 2000 may recover the recovery target block. For example, the master node 2000 may recover the recovery target block based on at least one of the received log data of the recovery target block and the received recovery data of the recovery target block.

The master node 2000 may extract the log data of the recovery target block, the recovery data of the recovery target block, or a combination thereof from the received log data of the recovery candidate block, the received recovery data of the recovery candidate block, or a combination thereof In addition, the master node 2000 may perform the recovery based on the extracted data.

For example, the master node 2000 may reflect the changes which have not yet been reflected to the recovery target block recorded in the persistent storage medium.

When the master node 2000 recovers the recovery target block, the master node 2000 may decide as a first group one or more recovery target blocks positioned adjacent to each other in the persistent storage medium and recover the determined one or more recovery target blocks included in the first group during the same time period. The master node 2000 recovers one or more recovery target blocks positioned adjacent to each other in the persistent storage medium together to increase the efficiency of the recovery.

The master node 2000 may restrict accesses of other nodes to the recovery target blocks while the recovery target block is recovered. For example, the master node 2000 may not restrict the accesses of other nodes to all tables including the recovery target block and restrict the accesses of other nodes only to the corresponding recovery target block which is recovered while the recovery target blocks are recovered.

According to an exemplary embodiment of the present disclosure, the coordinator node 1000 reads the log data to decide one or more recovery candidate blocks and decide the master nodes of one or more respective recovery candidate blocks. The master node 2000 may decide at least one recovery target block among the decided one or more recovery candidate blocks. The coordinator node 1000 re-reads the log data to acquire the recovery data of the recovery target block and the master node 2000 may recover the recovery target block by using the recovery data. In this case, when the plurality of master nodes 2000 is provided, the respective master nodes 2000 may recover the recovery target block managed by the master node 2000.

According to an exemplary embodiment of the present disclosure, the coordinator node 1000 repeatedly reads the log data, and as a result, the plurality of respective master nodes may recover the recovery target block in parallel and recovery efficiency of the block stored in the persistent storage medium 3000 may be increased.

In this case, the recovery target blocks are recovered by the plurality of nodes by the unit of the block, and as a result, when the plurality of nodes performs the recovery, the dependency among the plurality of nodes may be removed, thereby increasing efficiency of the recovery of the recovery target blocks.

Since a node that modifies the corresponding block for each block is fixed to the master node 2000, the coordinator node 1000 and the master node 2000 transmit/receive only data (e.g., the log data or the recovery data) associated with the recovery without transmitting/receiving the block through the network, and as a result, a data transmission quantity of the network may be decreased.

Since the plurality of nodes participates in the recovery and one block is present only in one buffer, a buffer cache hit rate increases, and as a result, a recovery speed may be further increased.

According to another exemplary embodiment of the present disclosure, the coordinator node 1000 may include a plurality of control units 1300. The coordinator node 1000 may perform the aforementioned operations through the plurality of control units 1300 in parallel.

According to another exemplary embodiment of the present disclosure, the master node 2000 may include a plurality of control units 2300. The master node 2000 may perform the aforementioned operations through the plurality of control units 1300 in parallel.

FIG. 6 is a diagram for describing a method for recovering data of a block when a proxy node and a master node of the block are different from each other according to another exemplary embodiment of the present disclosure.

In FIGS. 2 to 5 described above, the exemplary embodiments of the case where the master nodes 2000 and the proxy nodes of the recovery candidate block and the recovery target block are the same as each other have been described.

In FIG. 6, the exemplary embodiment of the case where the master nodes 2000 and the proxy nodes of the recovery candidate block and the recovery target block are different from each other will be described.

According to the exemplary embodiment of the present disclosure, the operations performed by the coordinator node 1000, the transmission/reception module 2100, the cache module 2200, and the recovery target block deciding unit 2320 of the master node 2000, and the persistent storage medium 3000 of FIG. 6 have been described in detail in FIGS. 2 to 5.

According to an exemplary embodiment of the present disclosure, the proxy node 4000 may include a control unit 4100 and the control unit 4100 of the proxy node 4000 may include a plurality of recovery performing unit 4110.

According to an exemplary embodiment of the present disclosure, the proxy node 4000 may receive information on the recovery target block. For example, the proxy node 4000 may receive the information on the recovery target block from the master node 2000 and receive from the coordinator node 1000 but is not limited thereto.

The control unit 4100 of the proxy node 4000 may distribute a plurality of recovery target blocks to the plurality of recovery performing units 4110, respectively so that each the plurality of recovery performing units 4110 may perform the recovery.

For example, when the number of recovery performing units 4110 is three and the number of recovery target blocks is five, the control unit 4100 of the proxy node 4000 may distribute two recovery target blocks to a first recovery performing unit 4110, distribute two recovery target blocks to a second recovery performing unit 4110, and one recovery target block to a third recovery performing unit 4110. Further, the control unit 4100 of the proxy node 4000 may distribute three recovery target blocks to the first recovery performing unit 4110 and distribute two recovery target blocks to the second recovery performing unit 4110 but is not limited thereto.

In this case, the control unit 4100 of the proxy node 4000 may distribute the recovery target blocks based on a physical position at which the plurality of recovery target blocks is stored on the persistent storage medium 3000.

For example, the control unit 4100 of the proxy node 4000 may distribute target blocks positioned adjacent to each other to the same recovery performing unit 4110.

A criterion of the distribution is just one exemplary embodiment and the control unit 4100 is not limited to the aforementioned example and may distribute the recovery target blocks based on various criteria.

According to an exemplary embodiment of the present disclosure, the recovery target blocks are distributed to the recovery performing unit 4110 by the unit of the block, and as a result, when the plurality of recovery performing units 4110 performs the recovery, dependency among the plurality of recovery performing units 4110 may be removed, thereby increasing efficiency of the recovery of the recovery target block.

According to another exemplary embodiment of the present disclosure, the recovery target blocks may be distributed by control unit 4100 of the proxy node 4000.

According to an exemplary embodiment of the present disclosure, the recovery data acquiring unit 1360 of the coordinator node 1000 re-reads the log data stored in the persistent storage medium 3000 to acquire the log data associated with one or more respective recovery target blocks. Further, the transmission/reception module 1100 of the coordinator node 1000 may transmit the log data associated with one or more respective recovery target blocks to the respective proxy nodes 4000.

According to an exemplary embodiment of the present disclosure, the recovery data acquiring unit 1360 of the coordinator node 1000 re-reads the log data stored in the persistent storage medium 3000 to acquire the log data associated with one or more respective recovery target blocks. Further, the transmission/reception module 1100 of the coordinator node 1000 may transmit the log data associated with one or more respective recovery candidate blocks to the respective proxy nodes 4000.

According to another exemplary embodiment of the present disclosure, the recovery data acquiring unit 1360 of the coordinator node 1000 re-reads the log data stored in the persistent storage medium 3000 to acquire the recovery data associated with one or more respective recovery target blocks. Further, the transmission/reception module 1100 of the coordinator node 1000 may transmit the recovery data associated with one or more respective recovery target blocks to the respective proxy nodes 4000.

According to another exemplary embodiment of the present disclosure, the recovery data acquiring unit 1360 of the coordinator node 1000 re-reads the log data stored in the persistent storage medium 3000 to acquire the recovery data associated with one or more respective recovery candidate blocks. Further, the transmission/reception module 1100 of the coordinator node 1000 may transmit the recovery data associated with one or more respective recovery candidate blocks to the respective proxy nodes 4000.

Herein, the recovery data means data associated with changes which need to be reflected to the recovery target block. For example, the recovery data may include information on changes which are not reflected to the recovery target block among changes which occur during the recovery time period.

In this case, when the coordinator node 1000 and the proxy node 4000 are the same as each other, the transmission/reception module 1100 of the coordinator node 1000 may not transmit the log data of the recovery target block, the recovery data of the recovery target block, the log data of the recovery candidate block, the recovery data of the recovery candidate block, or a combination thereof.

The proxy node 4000 may receive at least one of the log data of the recovery target block, the recovery data of the recovery target block, the log data of the recovery candidate block, and the log data of the recovery candidate block.

The recovery performing unit 4110 of the proxy node 4000 may perform the recovery based on the received log data of the recovery target block, the received recovery data of the recovery target block, or a combination thereof.

For example, the recovery performing unit 4110 may reflect the changes which have not yet been reflected to the recovery target block recorded in the persistent storage medium.

The recovery performing unit 4110 of the proxy node 4000 may extract the log data of the recovery target block, the recovery data of the recovery target block, or a combination thereof from the received log data of the recovery candidate block, the received recovery data of the recovery candidate block, or a combination thereof. Further, the recovery performing unit 4110 of the proxy node 4000 may perform the recovery based on the extracted data.

When the recovery performing unit 4110 of the proxy node 4000 recovers the recovery target block, the proxy node 4000 may decide as a first group one or more recovery target blocks positioned adjacent to each other in the persistent storage medium and recover the determined one or more recovery target blocks included in the first group during the same time period. The proxy node 4000 recovers one or more recovery target blocks positioned adjacent to each other in the persistent storage medium together to increase the efficiency of the recovery.

The proxy node 4000 may include the plurality of recovery performing units 4110 and recover the plurality of recovery target blocks in parallel.

A plurality of proxy nodes 4000 may recover the recovery target blocks in parallel.

The master node 2000 may restrict accesses of other nodes to the recovery target blocks while the recovery target block is recovered. For example, the master node 2000 may not restrict the accesses of other nodes to all tables including the recovery target block and restrict the accesses of other nodes to the corresponding recovery target block which is recovered while the recovery target blocks are recovered by the proxy node 4000.

According to an exemplary embodiment of the present disclosure, the coordinator node 1000 reads the log data to decide one or more recovery candidate blocks and decide the master nodes of one or more respective recovery candidate blocks. The master node 2000 may decide at least one recovery target block among the decided one or more recovery candidate blocks. Thereafter, the coordinator node 1000 re-reads the log data to acquire the recovery data of the recovery target block and the proxy node 4000 may recover the recovery target block by using the recovery data. In this case, when the plurality of proxy nodes 4000 is provided, the respective proxy nodes 4000 may recover the recovery target block in parallel.

According to an exemplary embodiment of the present disclosure, the coordinator node 1000 repeatedly reads the log data, and as a result, the plurality of respective proxy nodes may recover the recovery target block in parallel and recovery efficiency of the block stored in the persistent storage medium 3000 may be increased.

In this case, the recovery target blocks are recovered by the plurality of nodes by the unit of the block, and as a result, when the plurality of nodes performs the recovery, the dependency among the plurality of nodes may be removed, thereby increasing efficiency of the recovery of the recovery target blocks.

Since a node that modifies the corresponding block for each block may be fixed to the proxy node 4000, the coordinator node 1000, the master node 2000, and the proxy node 4000 transmit/receive only data (e.g., the log data or the recovery data) associated with the recovery without transmitting/receiving the block through the network, and as a result, a data transmission quantity of the network may be decreased.

Since the plurality of nodes participates in the recovery and one block is present only in one buffer, a buffer cache hit rate increases, and as a result, a recovery speed may be further increased.

According to another exemplary embodiment of the present disclosure, the coordinator node 1000 may include the plurality of control units 1300. The coordinator node 1000 may perform the aforementioned operations through the plurality of control units 1300 in parallel.

The exemplary embodiment of the present disclosure may be implemented even in the form of a recording medium including a command executable by a computer such as a program module executed by the computer. A computer readable medium may be a predetermined available medium accessible by the computer or includes all of volatile and non-volatile media and removable and irremovable media. Further, the computer readable recording medium may include a temporary recording medium and a non-temporary recording medium.

The computer readable medium may include both a computer storage medium and a communication medium. The computer storage medium includes all of the volatile and non-volatile and removable and irremovable media implemented by a predetermined method or technology for storing information such as a computer readable command, a data structure, a program module, or other data. The communication medium typically includes the computer readable command, the data structure, the program module, or other data of a modulated data signal such as a carrier, or other transmission mechanisms and includes a predetermined information transfer medium.

The description of the present disclosure is used for illustration and those skilled in the art will understand that the present disclosure can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A computer-implemented method for recovering a database block, the method comprising:
    deciding, via a recovery candidate block deciding unit of a coordinator node, one or more recovery candidate blocks by reading log data recorded in a persistent storage medium;
    deciding, via a master node deciding unit of the coordinator node, master nodes of the one or more respective recovery candidate blocks;
    re-reading, via a recovery data acquiring unit of the coordinator node, the log data in order to permit proxy nodes of the one or more respective recovery target blocks to recover at least one recovery target block among the one or more recovery candidate blocks in parallel, wherein the master nodes of the one or more recovery candidate blocks restrict access to only the at least one recovery target block among the one or more recovery candidate blocks, wherein the re-reading of the log data comprises acquiring, via the recovery data acquiring unit of the coordinator node, log data of the recovery target block by re-reading the log data recorded in the persistent storage medium; and
    transmitting, via a transmission/reception module of the coordinator node, the acquired log data of the recovery target block to the proxy node of the recovery target block, wherein the recovery target block is recovered by the proxy node of the recovery target block.

2. The method of claim 1, further comprising:
    transmitting, via a transmission/reception module of the coordinator node, data associated with the recovery candidate block to the master nodes of the one or more respective recovery candidate blocks; and
    selectively receiving, via the transmission/reception module of the coordinator node, information indicating whether the recovery candidate block is the recovery target block from the master nodes of the one or more respective recovery candidate blocks, the master node deciding whether the recovery candidate block is the recovery target block based on at least some of the information included in data associated with the recovery candidate block.

3. The method of claim 2, wherein the master node decides whether the recovery candidate block is the recovery target block based on at least some of whether a change which needs to be reflected in the recovery candidate block has already been reflected in the recovery candidate block and whether information on the change which needs to be reflected in the recovery candidate block is present in another node by referring to at least some of the received data associated with the recovery candidate block.

4. The method of claim 3, wherein when the information on the change which needs to be reflected in the recovery candidate block is present in another node, the master node allows the other node to reflect the change to the recovery candidate block.

5. The method of claim 1, wherein in the deciding of the one or more recovery candidate block comprises deciding, via a recovery target block deciding unit of a coordinator node, the one or more recovery candidate block based on block address information included in the log data, block change point-of-time information included in the log data, block recording point-of-time information included in the log data, or a combination thereof.

6. The method of claim 1, wherein the master nodes of the one or more respective recovery target blocks restrict accesses of other nodes to the recovery target block among a plurality of blocks which is present in the persistent storage medium.

7. The method of claim 1, wherein the proxy nodes of the one or more respective recovery target blocks decide as a first group one or more recovery target blocks positioned adjacent to each other in the persistent storage medium and recover the decided one or more recovery target blocks included in the first group during the same time period.

8. A database recovery program which is stored in a non-transitory computer-readable medium and includes commands, that when executed by processors of computer nodes, causes the computer nodes to perform the following operations, the operations comprising:
    an operation of deciding, by a coordinator node, at least one recovery candidate block by reading log data recorded in a persistent storage medium;
    an operation of deciding, by the coordinator node, master nodes of the at least one respective recovery candidate blocks;
    an operation of deciding, by the master nodes of the at least one respective recovery candidate blocks, at least one recovery target block among the one or more recovery candidate blocks and limit access to only the recovery target block;
    an operation of acquiring, by the coordinator node, the decided log data of the at least one recovery target block by re-reading the log data recorded in the persistent storage medium, wherein the re-reading of the log data comprises acquiring, via the coordinator node, log data of the recovery target block by re-reading the log data recorded in the persistent storage medium;
    an operation of transmitting, via the coordinator node, the acquired log data of the recovery target block to the proxy node of the recovery target block, wherein the recovery target block is recovered by the proxy node of the recovery target block; and
    an operation of recovering, by proxy nodes of the one or more respective recovery target blocks, the recovery target block based on the acquired log data of the at least one recovery target block, wherein the proxy nodes of the at least one respective recovery target blocks perform the recovery in parallel.

\* \* \* \* \*